United States Patent [19]

Van Bosse

[11] 4,421,951

[45] Dec. 20, 1983

[54] METHOD AND ARRANGEMENT FOR SIGNALING THE TRANSMISSION MODE OF A COMMUNICATION SYSTEM

[75] Inventor: John G. Van Bosse, Naperville, Ill.

[73] Assignee: Bell Telephone Laboratories, Incorporated, Murray Hill, N.J.

[21] Appl. No.: 305,124

[22] Filed: Sep. 24, 1981

[51] Int. Cl.³ .......................................... H04M 11/00
[52] U.S. Cl. ................................................. 179/2 DP
[58] Field of Search ................. 179/2 C, 2 CA, 2 DP, 179/3, 4; 307/236

[56] References Cited

U.S. PATENT DOCUMENTS

| | | |
|---|---|---|
| 3,454,724 | 7/1969 | Herter . |
| 3,505,475 | 4/1970 | Carbone et al. . |
| 3,566,032 | 2/1971 | Carbone et al. . |
| 3,908,086 | 9/1975 | Marino et al. .................. 179/2 DP |
| 4,009,342 | 2/1977 | Fahrenschon et al. .......... 179/2 DP |
| 4,246,442 | 1/1981 | Hashimoto ....................... 179/2 DP |
| 4,306,116 | 12/1981 | McClure et al. ................ 179/2 DP |
| 4,321,429 | 3/1982 | Takatsuki et al. ............... 179/2 DP |

FOREIGN PATENT DOCUMENTS 440805  2/1975  U.S.S.R. .................................. 179/4

OTHER PUBLICATIONS

Taley, D.; *Basic Telephone Switching Systems*, 1969; pp. 26–29, 34–37; Hayden Book Co.

*Primary Examiner*—G. Z. Rubinson
*Assistant Examiner*—Keith E. George
*Attorney, Agent, or Firm*—John A. Caccuro

[57] ABSTRACT

The disclosed communication system operating mode signaling method and arrangement utilizes dc current signaling over the loop facility connecting a customer to a central office (CO). The dc current on the facility provides concurrent on-hook/off-hook signaling and voice/digital data operating mode signaling between the customer and CO. A current flow in a first direction over the facility signals a voice operating mode while a current flow in a second direction signals a digital data operating mode. A customer signals a change in the operating mode by reversing the direction of allowed current flow at the customer unit. The resulting interruption of the current flow is detected at the CO which responds by reversing the direction of current flow over the facility. The reappearance of current flow over the facility distinguishes a customer's change in operating mode from an on-hook condition.

24 Claims, 6 Drawing Figures

METHOD AND ARRANGEMENT FOR SIGNALING THE TRANSMISSION MODE OF A COMMUNICATION SYSTEM

TECHNICAL FIELD

This invention relates to signaling arrangements and more particularly to a method and apparatus for signaling the analog and digital data operating modes of a communicating system.

BACKGROUND OF THE INVENTION

The increasing need for data communication services is being accommodated today by using both separate data networks and by integrating digital data communication service over existing voice communication (telephone) networks. Typically, when both voice and digital data communication capabilities are provided over the existing telephone network a modem is utilized to provide the digital data communications. In such systems, the digital data is converted to an analog signal using the modems and no changes are required at the local telephone central office to provide a digital data communication channel. However, when it is desirable to transmit high speed data as a digital signal, circuit changes are required at both the user's location and at the local telephone office to enable the transmission and reception of the digital signal over the loop facility. Additionally, if it is desirable to have a system with a capability to transmit either voice or digital signals over the loop facility, the user must signal the operating mode of the system to the local telephone office.

In one prior signaling method the customer signal changes in the system operating mode to the local office by dialing special codes and awaiting a confirmation signal from the local central office. In such an arrangement, the operating mode signaling from the customer to the local office exists as either frequency tones or digital data characters. When frequency tones are used for mode signaling a tone receiver is required at the local office. Similarly, if digital data characters are used for mode signaling, a digital data receiver is required at the local office. Both the frequency tone mode signaling and digital character signaling arrangements require using the same loop facility used for the transmission of the voice or digital data information. To prevent interference with the voice or digital data signals mode, signaling must be done at a time when no voice or digital data signals are on the loop facility. Consequently, since the system operating mode information is not always present on the loop facility, system memory must be utilized to remember the system operating mode. Additionally, this memory must be accessed each time the operating mode information is required by the telephone network. The above tone or digital character signaling arrangements result in additional complexity in the circuitry of a shared voice/digital data system which share a common telephone network.

SUMMARY OF THE INVENTION

The disclosed communication system operating mode signaling method and arrangement utilizes dc current signaling over the loop facility connecting the customer to the local central office. This dc current signaling arrangement provides both continuous voice/digital data operating mode signaling and continuous on-hook/off-hook signaling over the loop facility connecting the customer unit to the central office unit.

In the present invention, the existence of a dc current flow over the loop facility indicates an off-hook condition at a customer's unit while the direction of the current flow over the facility indicates the communicating or operating mode of the system. A current flow in a first direction over the transmission facility signals a system voice operating mode while a current flow in the opposite direction signals a system digital data operating mode. A customer or subscriber signals a change in the system operating mode by reversing the direction of the current drain at the customer unit. The resulting interruption of the dc current flow is detected by the central office unit which responds by reversing the polarity of the current source connected to the facility. The reappearance of a dc current flow on the facility distinguishes a customer's change in operating mode from a customer's call termination (on-hook) condition.

In a preferred embodiment, the disclosed dc signaling arrangement is utilized as part of an alternate voice/digital data system where the customer can alternately switch an active call between the voice and digital data operating modes. In such a system, the customer (or subscriber) dials an access code and the telephone number of the called party. The access code is utilized by the telephone network to distinguish a voice only call from an alternate voice/digital data call.

The initial connection between the calling and called customer is established in the voice mode. Once the connection is established either the calling or the called customer can change the direction of allowed current flow on the facility to the central office to initiate an operating mode change from the voice mode to the digital data mode and vice versa.

Timing circuits at the central office distinguish a hit or other inadvertent dc current interruption from a customer's valid operating mode change. The central office responds to a valid operating mode change current interruption by reversing the polarity of the battery feed to the facility. If the current flow over the customer's facility does not resume within a predetermined time period the central office recognizes this condition as a customer on-hook condition rather than a customer request to change from a voice to a digital data operating mode. If a valid digital data operating mode is established the central office makes appropriate network changes to facilitate digital data transmission between the customers.

At the conclusion of voice and digital data transmission either of the customers can go on-hook interrupting the dc current flow over their respective facilities causing the central office to release the established connection.

BRIEF DESCRIPTION OF THE DRAWINGS

The principles of the invention will be more fully appreciated from the illustrative embodiment shown in the drawing, in which.

GENERAL DESCRIPTION

Figure 3:
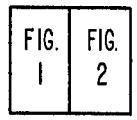
FIG. 3 shows the association of FIG. 1 and FIG. 2.
Figure 1:
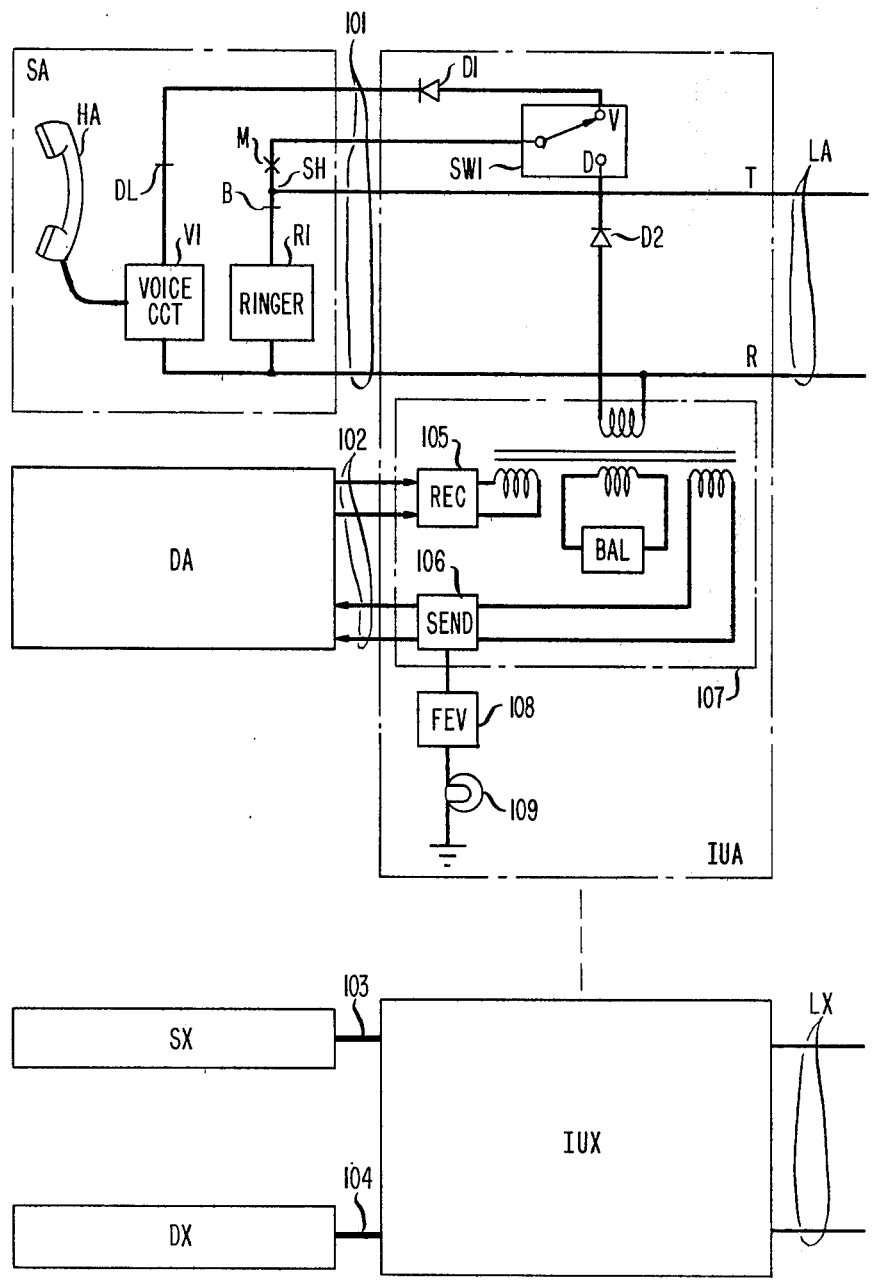
FIG. 1 shows a circuit diagram of the customer apparatus of my invention.

With reference to FIG. 1, the apparatus located at a customer or subscriber location is shown. The apparatus includes telephone set SA and data set DA which are shown connected to interface unit IUA via cables 101 and 102 respectively. Similarly, at customer location X telephone set SX and data set DX connect to interface unit IUX via cables 103 and 104 respectively. Interface units IUA and IUX connect via loop transmission facilities LA and LX, respectively, to local central office COA (shown in FIG. 2). Interface unit IUA includes switch SW1 for switching or coupling the signaling (dc current) means to the facility. These operating mode signaling means (D1, D2) signal a voice operating mode or a digital data operating mode of the system. While in the preferred embodiment the two operating or communicating modes are illustratively used for communicating voice or digital data signals, it will be immediately obvious to one skilled in the art that other types of signals can be communicated during these operating modes. Diode D1 provides a means for signaling a voice operating mode to central office COA by enabling a current flow from the tip T lead to the ring R lead of loop facility LA. Diode D2 provides a means for signaling a digital data operating mode to central office COA by enabling a current flow from the ring R lead to the tip T lead of loop facility LA.

Figure 2:
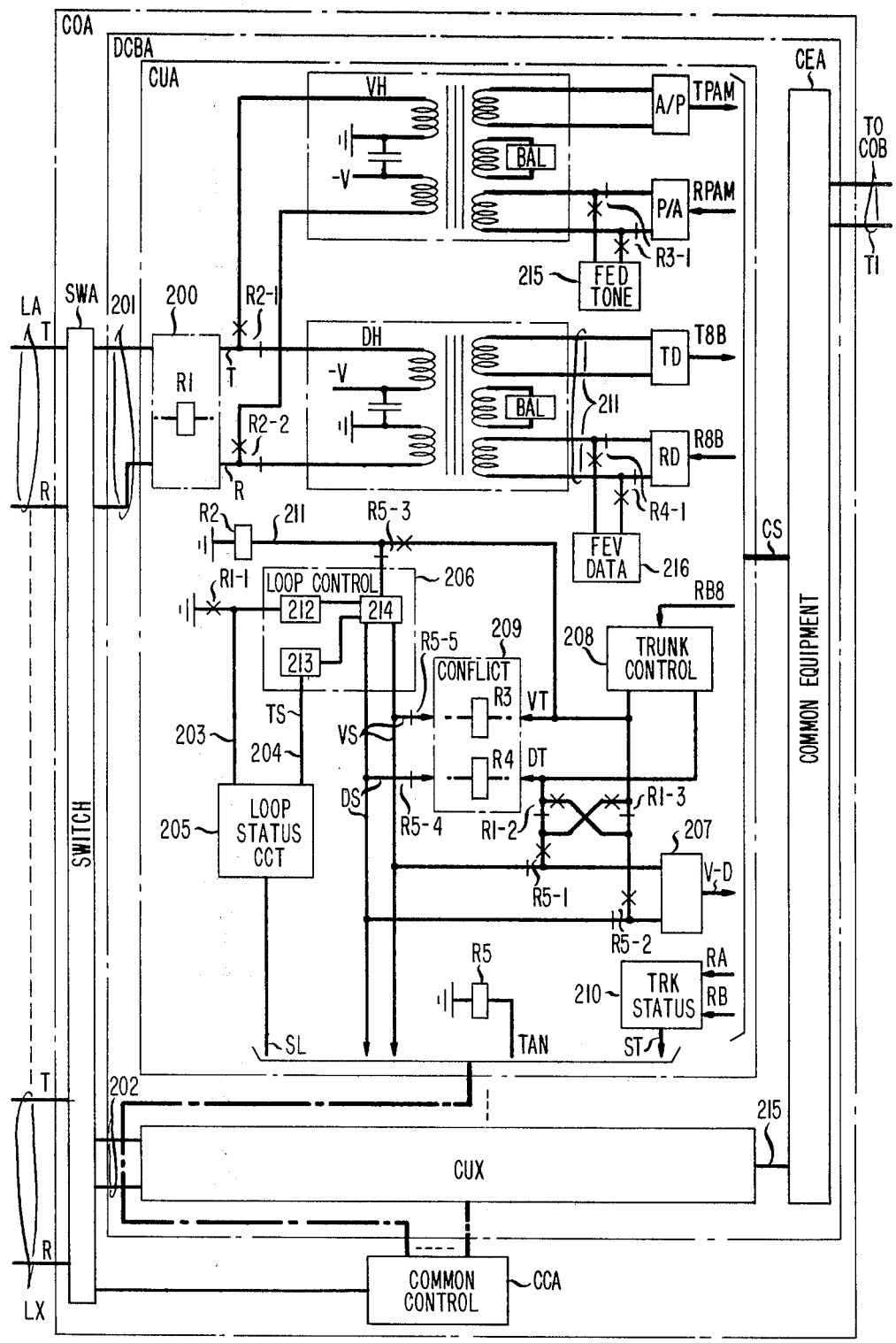
FIG. 2 shows a circuit diagram of the central office apparatus of my invention.

With reference to FIG. 2, facilities LA and LX terminate on switch SWA of central office COA. Channel units CUA and CUX at central office COA also connect to switch SWA. While switch SWA shown in FIG. 2 is preferably a No. 1/1A ESS, my invention can similarly be implemented with any crossbar or step by step type of central office switch which can pass dc currents. The operation of the No. 1 ESS is well known, for example see the September 1964 issue of the *Bell System Technical Journal.* In the description that follows only the operation of circuitry of the No. 1 ESS required for an understanding of my invention will be discussed. Common control CCA enables switch SWA, in a well-known manner, to provide a communication connection between the loop facilities (LA and LX) and channel units (CUA and CUX). Channel units CUA and CUX as well as common equipment CEA are part of digital channel bank DCBA.

Channel units CUA and CUX convert the analog voice or digital data signals from customer A and X into a digital format for transmission over a digital carrier (e.g. T1 carrier) line T1. While a T1 carrier is described herein, other digital carrier systems can obviously be utilized. Carrier line T1 connects central office COA with other central offices. Common equipment CEA of digital channel bank CBA multiplexes the signals from channel units CUA and CUX onto interoffice T1-carrier line T1. The operation of a typical digital channel bank is described in U.S. Pat. No. 4,059,731 issued on Nov. 22, 1977 to Green et al which is incorporated by reference herein. Only the operation of circuitry of the channel unit required for an understanding of my invention will be discussed herein.

Channel units CUA and CUX utilized in the disclosed invention include voice hybrid VH which establishes, during a voice operating mode, a first direction of current flow (from T and R lead) over loop facilities LA and LX. Also included is digital data hybrid DH which establishes, during a digital data operating mode, a direction of current flow (from R to T lead) over loop facilities LA and LX. Relay R1 detects interruption of loop current flow. Relay R2 provides a means for switching between the voice hybrid VH and digital data hybrid DH or vice versa in response to a current interruption signal from relay R1. Loop status circuit is responsive to a continued interruption of loop current to cause a termination of the voice or data operating mode by appropriately signaling common control CCA.

Common control unit CCA of FIG. 2 can be implemented as a separate computer controller operating under program control or can be incorporated as part of the controller for either switch SWA or digital channel bank DCBA. In the following description common control unit CCA controls channel units CUA and CUX, common equipment CEA, and switch SWA to enable the various call connections through central office COA.

DETAILED DESCRIPTION

Establishing a Voice Mode Connection

Referring to FIG. 1, assuming that telephone set SA is on-hook, no current flows over the tip T and ring R leads of facility LA. A telephone call is initiated when a subscriber or customer A places telephone set SA in an off-hook condition. In the closed signaling arrangement the on-hook to off-hook transition occurs only during a voice operation mode. Before going off-hook at telephone set SA customer A places interface IUA in the voice mode by setting switch S1 to the voice position V. Switch SW1 provides a control for customer A to switch between the voice and digital data operating modes. Switch SW1 could be made to switch to the voice mode automatically when customer A goes off-hook. When telephone set SA goes off-hook, current is provided by central office COA over the tip lead T through make switch hook contact M, switch S1, diode D1, dial contact DL, voice circuit V1 and back to central office COA via ring lead R. Thus, when subscriber interface IUA enables a current from the T lead to the R lead a voice operating mode is signaled to central office COA. While the disclosed invention is described with reference to a dc current interruption used to provide the on-hook and off-hook signaling (supervision), obviously any discrete dc current change on the facility, initiated by a subscriber, could be utilized to provide such on-hook and off-hook signaling. Additionally, dc voltage signaling could also be utilized in which no dc current flows over the facility.

Figure 4:
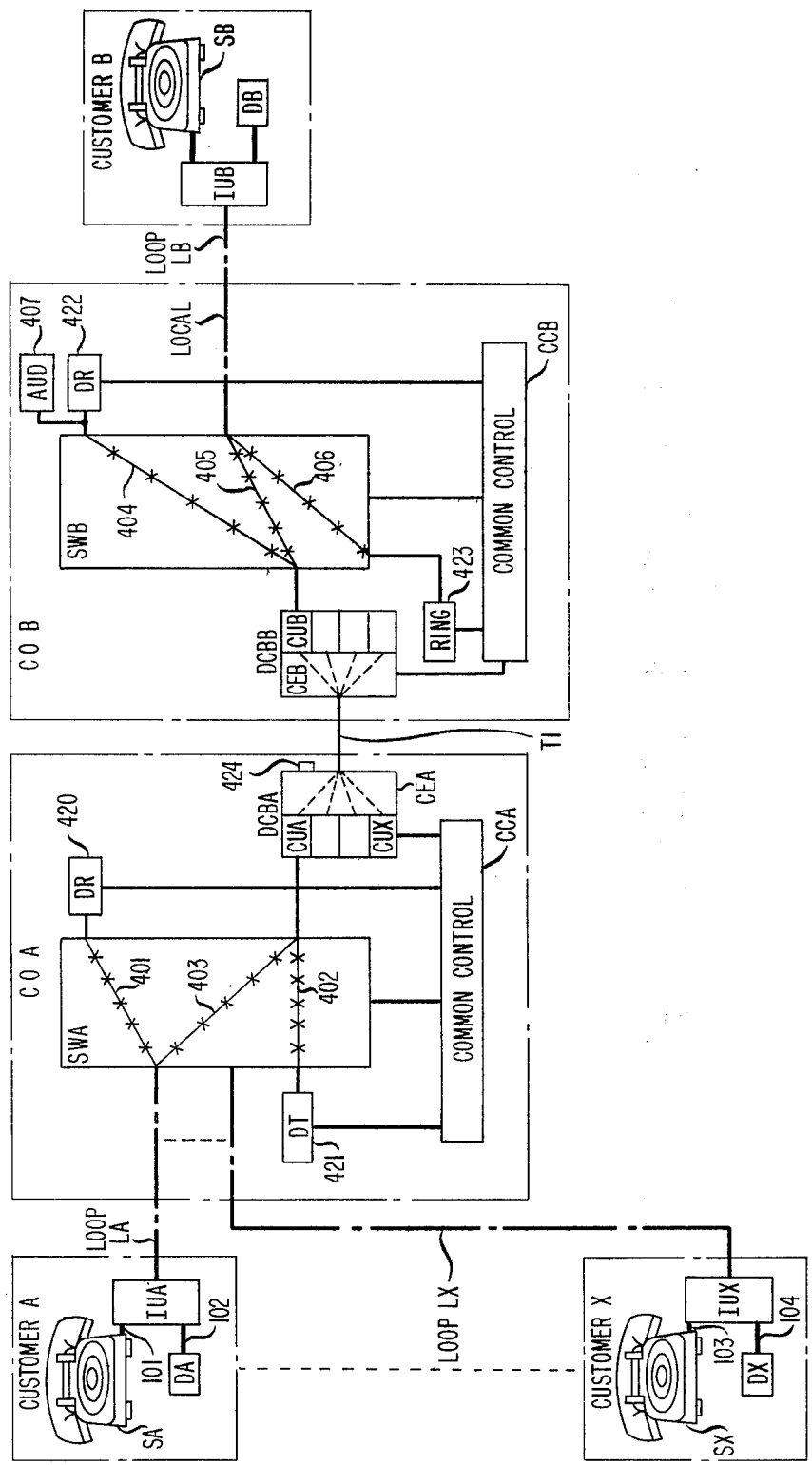
FIG. 4 shows a typical local call connection path between customers.

Referring to FIG. 4, when central office COA detects current flow from the T to R leads it performs the well-kown normal loop tests (power cross, etc.) and connects a switching path 401 through switch SWA between customer A and a digit receiver (DR) 420. Digit receiver 420 provides a dial tone to customer A. These operations are the standard well-known functions performed at central office locations.

Customer A starts dialing (using rotary dialing or TOUCH-TONE dialing) when dial tone is received. Customer A dials the alternate voice/digital data V/D accesss code to indicate to central office COA that customer A desires to send voice or digital data over loop A. Thereafter, customer A dials the telephone number of customer B located at a second central office COB. When customer A has completed dialing common control CCA of central office COA seizes a channel unit CUA of an outgoing trunk of carrier facility T1 to central office COB. Since not all customer facilities at central office COA are provided with the disclosed alternate voice/digital data V/D capability central office COA must detect the V/D access code on an originating call and then connect it to a channel unit CUA and trunk having the V/D capability. The receiving central office COB knows a V/D call is being received since a V/D trunk is being utilized. Common control CCA sets up a switching connection 402 between digit transmitter (DT) 421 and channel unit CUA.

Central office COB detects a seizure of an incoming trunk and sets up a switching connection 404 to a digit receiver (DR) 422. Digit transmitter (DT) 421 of central office COA sends dialed digits to receiver 422 of central office COB. When the dialed digit transfer is complete central office COA releases switching connections 401 and 402 and establishes switching connection 403. Central office COB releases switching connection 404 and establishes switching connection 406 which connects a ring generator 423 to loop LB of the called subscriber or customer B. Central office COB also sets up connection 407 to provide an audible ringing signal back to customer A.

When customer B answers the call at telephone set B current flows from the T lead to the R lead of loop facility LB. When central office COB detects this current flow it releases switching connections 406 and 407 and establishes switching connections 405. Thus, a voice connection path now exists from customer A over loop A, switching connection 403, T1-carrier line or facility T1, switching path 405 and loop LB to customer B. Customer A and customer B can commence their voice communications.

With reference to FIG. 1, voice circuit V1 provides the means for communicating voice signals over facility LA during the voice operating or communicating mode. It is to be noted that switch SW1 switches the facility current through either voice circuit V1 or digital data coupler 107. While the disclosed arrangement shows telephone set SA powered directly from loop LA, it is contemplated that telephone set SA could be powered at the customer or subscriber location with appropriate switch contacts and circuitry to provide the disclosed signaling functions.

In both loop LA to customer A and loop LB to customer B current flows from the T lead to the R lead signaling a voice mode of operation to channel units CUA and CUB respectively. Communication of the voice or data operating mode information between central offices occurs using channel units CUA and CUB. The channel units encode the mode information as signaling bits of the T1-carrier signal.

In the above-described connection, the channel units CUA and CUB are in a "local" state and connect respectively to customer interface IUA and IUB. Channel units CUA and CUB also connect to T1-carrier facility T1. Carrier facility T1 is also referred to herein as carrier line T1 or carrier trunk T1. In the local state the operating mode of each channel unit (CUA or CUB) connected to a carrier facility (T1) at an end office (originating office COA or terminating office COB) should always follow the operating mode of each interface (IUA or IUB) connected via the associated loop facilities (LA or LB). To maintain this condition the channel units CUA and CUB detect the operating mode of these respective interface units IUA and IUB by determining the direction of current flow on the respective loops LA and LB.

Figure 5:
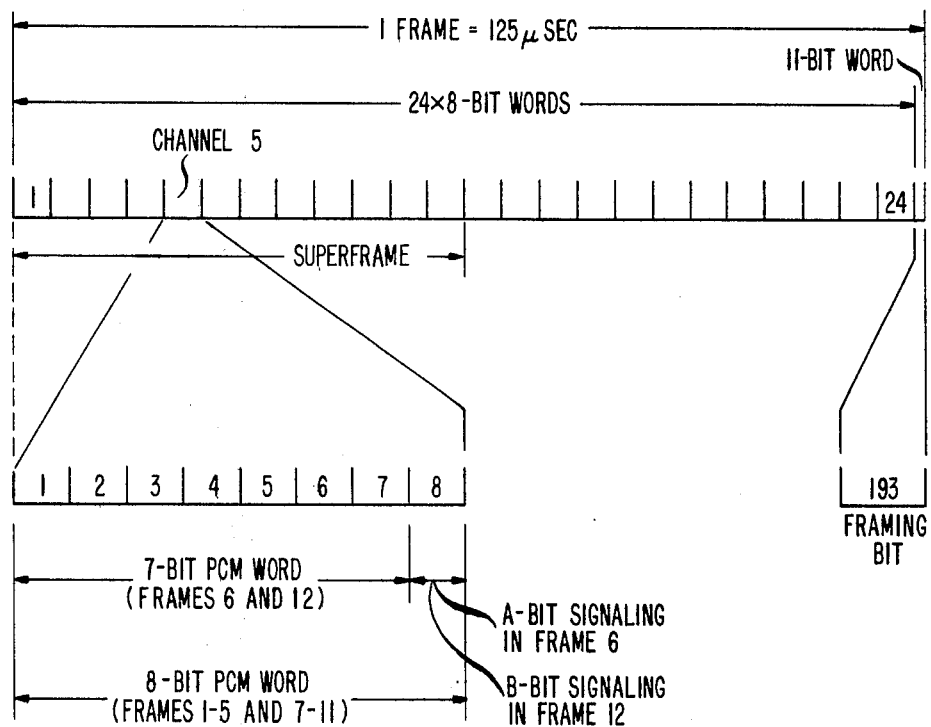
FIG. 5 shows the signaling bits utilized by my invention.

Channel units CUA and CUB inform each other of their operating mode by encoding bit 8 of frame 6 and 12 of the outgoing T-carrier signal on carrier trunk T1. With reference to the well-known T-carrier frame format shown in FIG. 5, bit 8 of frame 6 of each superframe is referred to as bit A while bit 8 of frame 12 of each superframe is referred to as bit B. There are many possible ways to encode the information regarding the operating mode. For purely illustrative purposes, we will use the following convention $A=0$, $B=1$ indicates a voice on-hook condition while $A=1$, $B=0$ indicates a voice off-hook condition. Thus, when interface IUA is in the on-hook condition, common control CCA places CUA in a local on-hook condition with $A=0$, $B=1$ and voice signals encoded in a PCM format. When IUA is in the voice off-hook condition common control CCA places CUA in a local off-hook condition with $A=1$, $B=0$ and voice signals from customer A are encoded in a PCM format. In the digital operating mode, which will be discussed later, a steady value $B8=0$ in all frames indicates the digital control signaling mode and a steady value $B8=1$ in all frames indicates the digital data mode. Since all V/D calls are initiated in a voice mode the digital data mode is by definition always in an off-hook condition.

As will be discussed later a conflict exists when a channel unit (CUA) determines that its customer's interface (IUA) is in a different (i.e., conflicting) mode than the channel unit (CUB) to which it is connected. During such a conflict the channel unit CUA sends either Far-End-Voice (FEV) control mode characters or Far-End-Digital (FED) tone to its interface (IUA) to indicate the state of the far end customers interface (IUB). A channel unit determines a conflict by comparing its own mode (which follows the mode of the connected IU) with the A and B bit pattern that it is receiving over the T-carrier facility T1.

Returning to the above-described established voice connection between customer A and customer B, each channel unit CUA and CUB sends $A=1$ and $B=0$ to each other. With reference to channel unit CUA of digital channel bank DCBA shown in FIG. 2, in the voice mode relay R2 is operated over lead 211 and the make contacts of transfer contacts R2-1 and R2-2 connect voice hybrid VH to line 201. Note, since channel units CUA and CUB are connected in a local state connection lead TAN out of common control CCA is at ground and hence relay R5 is not operated. Thus, the break contact of R5-3 remains closed enabling loop control 206 to control relay R2.

Analog voice signals from voice hybrid VH are sampled and pulse amplitude modulated (PAM) by converter A/P and are transmitted as signal TPAM to common equipment CEA. Common equipment CEA converts the PAM signal into a pulse coded modulation PCM signal which is then modulated as one of the channels of the T-carrier data stream shown in FIG. 5. The previously referenced U.S. Pat. No. 4,059,731 more completely describes the operation of a channel unit in a digital channel bank arrangement.

Returning to FIG. 2, loop status circuit 205 receives the status of loop LA and indicates the on-hook/off-hook status over lead SL to common control CCA. When current is flowing over line 201, the extention of loop LA through switching machine SWA, relay R1 of loop current monitor 200 is operative and make contact R1-1 puts a ground potential on lead 203 to loop status circuit 205. Additionally, loop status circuit 205 receives signal TS when a mode transition from a voice to digital or vice versa is occuring on loop LA. For either a ground on lead 203 or a TS signal on lead 204 loop status circuit 205 provides an off-hook signal over lead SL to common control CCA. Otherwise loop status circuit 205 transfers the on-hook status over central lead SL to common control CCA. Control signals DS and VS from loop control circuit 206 indicate, respectively, the digital or voice operating mode of customer A. Since channel unit CUA is in the local state, as noted previously, relay R5 is not operated and the break contacts of R5-1 and R5-2 remain closed. Unit 207 converts signals DS and VS into a signal on lead V-D which indicates a voice mode and causes common equipment CEA to encode the A=1, B=0 voice off-hook bit pattern in the T-carrier signal on carrier facility T1. Additionally, during the voice mode common equipment CEA accepts pulse amplitude modulated voice signals on lead TPAM and converts them into PCM digitized voice for transmission over carrier facility T1. Likewise it receives PCM digitized voice which is converted to pulse amplitude modulated voice signal and placed on lead RPAM. Note, during the digital data mode a signal exists on lead V/D indicating such a condition to common equipment CEA of digital channel bank DCBA. In the digital data mode digital channel bank DCBA accepts the PCM signal on lead T8B for transmission over carrier facility T1 and the received PCM signals are outputted on lead R8B.

Voice signals received from customer B over facility T1 are converted from a PCM signal to a PAM signal RPAM by common equipment CEA. A PAM to analog converter P/A reconstructs the voice signal for transmission through voice hybrid VH, line 201, switch SWA to customer A via loop LA.

Trunk control 208 monitors the bit 8 pattern received on line RB8 from common equipment CEA. Lead RB8 outputs the bit 8 (A and B bits) pattern of the data received over facility T1. If bit 8 is constantly a 0 or a 1 the incoming bits A and B are both constantly a 0 or 1 indicating a digital data mode and hence lead DT is at logic 1. If the bit 8 pattern is alternating (A=0, B=1, or A=1, B=0) indicating a voice mode then lead VT is logic 1. Conflict circuit 209 includes relays R3 and R4 which indicate respectively voice or digital mode conflicts. Since customer A is in a voice mode, signal VS is logic 1, if a voice mode signal VT is also logic 1 no conflict exists and relay R3 is not operated and the make contact of transfer contact R3-1 is open and prevents a far-end-digital FED tone from being outputted to customer A. However, if customer B is in a digital mode, signal VT is logic 0 and relay R3 is operated and break contact of R3-1 opens to prevent signals from customer B via unit P/A from reaching voice hybrid VH and customer A. Additionally, a FED tone from unit 215 is connected by the make contact of R3-1 to voice hybrid VH and customer A. The FED tone alerts customer A that customer B is in the digital data mode.

Note, trunk status circuit 210 also receives the bit A and B status over leads RA and RB and generates a trunk status signal ST for common control CCA.

Switching Between the Voice and Digital Data Modes

Either customer A or customer B can initiate a change from the established voice connection to a digital data connection. The following assumes that customer A switches to the digital mode. Referring to FIG. 1 again, customer A sets the operating mode selection switch SW1 to the digital data position D. Thus, the current flow from lead T through the mode switchhook contact SH, switch SW1, diode D1, dial contact DC, voice circuit V1 to lead R is interrupted. The presence of diode D2 in the digital position path prevents current from flowing from the T lead to the R lead of loop LA. While diodes D1 and D2 are illustrated as implementing circuits to selectively enable a certain direction of current flow over loop LA other circuits (transistors, etc.) are known to implement such characteristics.

Referring to FIG. 2, loop current monitor 200 detects an interruption of current on line 201 which is connected through switch SWA to loop LA. When the current on loop LA is interrupted relay R1 detects the interruption and releases causing make contact of R1-1 to open and an ungrounded signal to appears on lead 203. An interruption of current is an indication to channel unit CUA that either (1) a mode change command is being sent (2) that customer A has gone on-hook or (3) that a hit has occurred on loop LA. Current monitor 200 incorporates a timer or delay 212 which waits an appropriate length of time to insure that a hit has not occurred before changing the state of relay R2. The combination of relay R1, control circuit 206 and relay R2 provide a means for alternating the connection of voice hybrid VH and digital hybrid DH which generate the two directions of current flow over facility LA.

In response to a current interruption signal on lead 203, which exceeds the predetermined delay 212, circuit of loop control circuit 206 releases relay R2 and starts timer 213 which causes a logic 1 signal TS on lead 204 for a timed interval. If the current on loop LA reappears before timer 213 expires then the condition is regarded as a mode change request. However, as will be discussed later if the current on loop LA does not reappear, the condition is an on-hook condition by customer A.

In our mode change example the TS signal into loop status circuit 205 keeps an off-hook signal condition on lead SL to common control CCA. Thus, even though loop LA current is interrupted a termination or on-hook signal condition from circuit 205 to common control CCA does not result because of the timed or delayed transition signal TS on lead 204. When relay R2 releases, the make contacts of R2-1 and R2-2 are opened and the tip to ring current generated by the connection of voice hybrid VH to line 201 is terminated. A connection is established between digital hybrid DH and line 201 via the break contacts of R2-1 and R2-2. Relay R2 provides a means for connecting either the voice hybrid VH or the digital hybrid DH to facility LA. Relay R2 is operative from control signal 211 which is produced by control circuit 206. When digital hybrid DH is connected a negative voltage −V is applied to the T lead and a ground potential is applied to the R lead of line 201. The connection of digital hybrid DH to loop facility LA enables the generation of a current flow from the R lead to the T lead of loop facility LA.

Thus, referring again to FIG. 1, loop LA has −V on its T lead and a ground on its R lead. A current flow exists from lead R through coupler 107, diode D2 and make contact M of switchhook SH to lead T. This direction of loop current flow at subscriber interface IUA signals a digital data operating mode to central office COA. Since no current flows through voice circuit V1 telephone set SA is inoperative. Data unit DA, however, is now connected to loop LA via receive circuit 105, send circuit 106 and coupler 107.

Referring to FIG. 2, the resumption of current flow over loop LA and hence line 201 activates relay R1 of current monitor 200. Make contact R1-1 operates and causes a continued off-hook status signal SL to be given from loop status circuit 205 to common control CCA. The ground signal on lead 203 from make contact R1-1 also causes a logic 1 signal on lead DS and a logic 0 signal on lead VS to be generated by loop control 206. The timer 213 of loop control 206 is also cleared by the ground on lead 203 and consequently signal TS on lead 204 becomes logic 0. Loop control 206 signals common control CCA via the logic 1 on lead DS that a digital mode has been established by customer A.

Loop control 206 signals digital hybrid DH that a voice-to-digital transition has been initiated by customer A. Thereafter, digital hybrid DH and interface IUA go through an automatic balance sequence. The details of this balance sequence is not necessary to the understanding of the disclosed invention.

At channel unit CUB a conflict circuit (equivalent to 209 of channel unit CUA) detects that customer B is in the voice mode (VS is logic 1) and customer A is in the digital mode (VT is logic 0). Consequently, conflict relay R3 of channel unit CUB operates causing a FED tone to be outputted via make contact of R3-1 to customer B. Customer B receives the FED tone over the receiver of its handset (equivalent of HA of telephone set SA of FIG. 1). Customer B then decides whether it wants to switch to a digital mode.

After digital hybrid DH of channel unit CUA has been equalized it sends FEV (far end voice) characters to customer A interface IUA. A FEV character is sent to customer A via the make contact of R4-1 when relay R4 of conflict circuit 209 operates. Relay R4 operates when it receives a logic 1 on lead DS while a logic 0 is on lead DT. Lead DS being logic 1 since customer A has switched to the digital mode and lead DT being logic 0 since customer B is still in the voice mode. Referring to FIG. 1 again, the FEV signal is received from coupler 107 by FEV detector 108. Detector 108 causes lamp 109 or other indicator to turn on indicating that the far end customer B is in the voice mode. To remove this conflict situation customer A can wait a few moments for customer B to switch to the digital mode or can return to the voice mode.

Assuming that customer B switches to the digital mode the previously described operation for customer A would be repeated at customer B interface IUB and at channel unit CUB. That is, customer B sets switch SW1 to the digital mode causing a current interruption over loop LB. Then channel unit CUB reverses the battery feed to loop LB to reestablish current flow and the digital hybrid is equalized. In a manner similar to that described for interface IUA the hybrid of interface IUB is equalized. When equalization is completed at both interface IUA/channel unit CUA and interface IUB/channel unit CUB bidirectional digital communications between customers A and B commences over loop LA, trunk T1 and loop LB.

At channel unit CUA the digital hybrid DH, transmit data circuit TD, and receive data circuit RD communicate digital data between loop LA (via line 201) and common equipment CEA. Transmit data circuit TD outputs a 8-bit PCM data word over lead T8B. Common equipment CEA multiplexes the digital data from lead T8B into T-carrier format, of FIG. 5, for transmission over carrier facility T1. The digital data from common equipment CEA is demultiplexed into a 8-bit PCM data word on lead R8B which is coupled to receive data circuit RD.

It is to be noted that current monitor 200 of channel unit CUA continuously monitors current flow over loop LA. The direction of current flow on loop LA gives a continous indication of the digital operating mode of customer A. Likewise, the direction of current flow over loop LB gives channel unit CUB a continous indication of the operating mode of customer B. Additionally, channel unit CUA continuously knows the operating mode status of customer B by virtue of the continous pattern of signaling bits A and B received over carrier facility T1 from channel unit CUB. Similarly channel unit CUB continuously knows the operating mode of customer A by virtue of the continous pattern of signaling bits A and B. Thus, the operating mode status of both customer A and customer B is constantly available from the above signal conditions on loop LA, loop LB and carrier facility T1.

After digital data communication between customer A and customer B are completed either customer can hang up or return to the voice operating mode.

Off-Hook to On-Hook Transition

With reference again to FIG. 1, assume that customer A desires to go on-hook and terminate the digital communication mode. When customer A goes on-hook make contact M of switchhook SH is opened preventing current flow in loop LA. Break contact B of switchhook SH closes connecting ringer R1 across lead T and lead R. Ringer R1, however, does not conduct dc current and hence no current flows in loop LA.

With reference to FIG. 2, relay R1 of current monitor 200 is released by the interruption of current flow. When make contact R1-1 opens, timer 213 in loop control circuit 206 generates a transition signal TS on lead 204 to enable loop status circuit 205 to temporarily maintain an off-hook signal SL to common control CCA. Loop control circuit 206 operates relay R2 which disconnects digital hybrid DH and reconnects voice hybrid VH resulting in a battery reversal across the T and R lead of line 201 and hence loop LA. Since customer A has gone on-hook at telephone set SA current flow remains interrupted on loop LA when battery is reversed. After a continued current interruption on loop LA lasting a predetermined period of time, timer 213 of loop control circit 206 times out and transition signal TS disappears from line 204. In response to the continued loop current interruption lead SL of loop status circuit 205 gives mode terminating on-hook signal to common control CCA since lead 203 is not grounded and signal TS on lead 204 is not present. Common control CCA causes a voice on-hook condition (bit A=0, B=1) to be sent from channel unit CUA to channel unit CUB as part of the T-carrier signal on carrier facility T1. Referring to FIG. 4, the bit A=0, B=1 condition causes central office COA and central office COB to disconnect existing switching connections 403 and 405 respectively, thus terminating the connection between customers A and B. Channel unit CUA reverts to the voice mode when it is idle (on-hook).

Switching Between the Digital and Voice Modes

Assuming that customer A and customer B had an established digital connection between them, either customer A or customer B can initiate a return to the voice mode. With reference to FIG. 1 and assuming that customer A initiated the change from a digital to a voice mode, the following events take place. Customer A operates switch SW1 of interface IUA to the voice position V. The existing current flow from the R lead through coupler 107, diode D2, and switch SW1, make contact M to the T lead of loop LA is interrupted.

Referring to FIG. 2, current monitor 200 detects the current interruption and releases relay R1. Again timer 213 of loop control circuit 206 outputs a transition signal TS to loop status circuit 205. Loop status circuit 205 maintains an off-hook signal SL to common control CCA. Loop control circuit 206 also operates mode switching relay R2. The operation of relay R2 disconnects data hybrid DH and connects voice hybrid VH causing a battery reversal on the T and R leads of loop LA via line 201 and switch SWA. When current flow resumes on loop LA in a direction from lead T to lead R relay R1 operates. When relay R1 operates make contact R1-1 closes and timer 213 of loop control circuit 206 is reset. Make contact R1-1 places a ground on line 203 which enables loop status circuit 205 to maintain an off-hook signal to common control CCA. Loop control circuit 206 outputs a logic 1 signal on lead VS and a logic 0 signal on lead DS signifying a voice operating mode for customer A. Common control CCA receives signals on leads DS and VS and causes the voice mode $A=1$, $B=0$ bit pattern to be generated by common equipment CEA. Conflict circuit 209 receives the logic 1 on lead VS and releases relay R3 if a logic 1 signal exists on lead VT. A logic 1 signal would exist on lead VT only if customer B has switched to the voice mode and hence a $A=1$, $B=0$ bit 8 pattern is received on lead RB8 from the T-carrier signal received over carrier facility T1 from customer B.

If customer B has not switched to the voice mode lead VT has a logic 0 signal and relay R3 of conflict circuit 205 is operated. Consequently, make contact of R3-1 permits a FED (far end digital) tone to be outputted through voice hybrid VH to customer A. Thus, customer A knows of the status of his request to change from the digital to the voice operating mode. When customer B switches to the voice mode relay R3 releases and make contact R3-1 connects the signals received from customer B, via lead RPAM and converter P/A, to customer A.

At channel unit CUB (not shown) the transition of customer A from a digital mode to a voice mode results in a FEV (far end voice) control mode character being sent to customer B until customer B changes to the voice mode. A FEV character results because channel unit CUB is in the digital mode while channel unit CUA is in the voice mode. At interface IUB the FEV character results in a visual output FEV signal to customer B. When customer B switches to the voice mode the transition sequence of events previously described for customer A occur in the corresponding interface unit IUB and channel unit CUB of After customer B has made the transition from the digital to the voice mode channel unit CUA and channel unit CUB signal respectively customer A and customer B indicating that a voice connection is complete. Note that equalization or balancing of the voice hybrids is not required on transactions to the voice mode. Voice communication between customer A and customer B ensues.

During the voice operating mode the direction of current flow from the T lead to the R lead of loop LA gives channel unit CUA a continuous indication of the operating status of customer A via interface IUA. Channel unit CUA also continuously knows the operating mode status of customer B by virtue of the continuous pattern of signaling bits $A=1$, $B=0$ received over the carrier facility T1 from channel unit CUB. In a similar manner channel unit CUB has a continuous status indication of customer B and customer A. At the completion of voice communications either customer A or customer B can request a change to the digital operating mode or hang-up.

The above paragraphs have described the operation of my invention for signaling the voice and digital operating modes between customers having different local central offices. With references to FIGS. 1, 2 and 4, the connection between a customer A and a customer X which share the same local central office proceeds as previously described except that all the connections described at central office COB also occur in a similar manner at central office COA. As shown in FIG. 4, the connection between channel unit CUA and channel unit CUX would be through T-carrier loop-back connection 424 at central office COA.

Channel Units in a Tandem Connection

Figure 6:
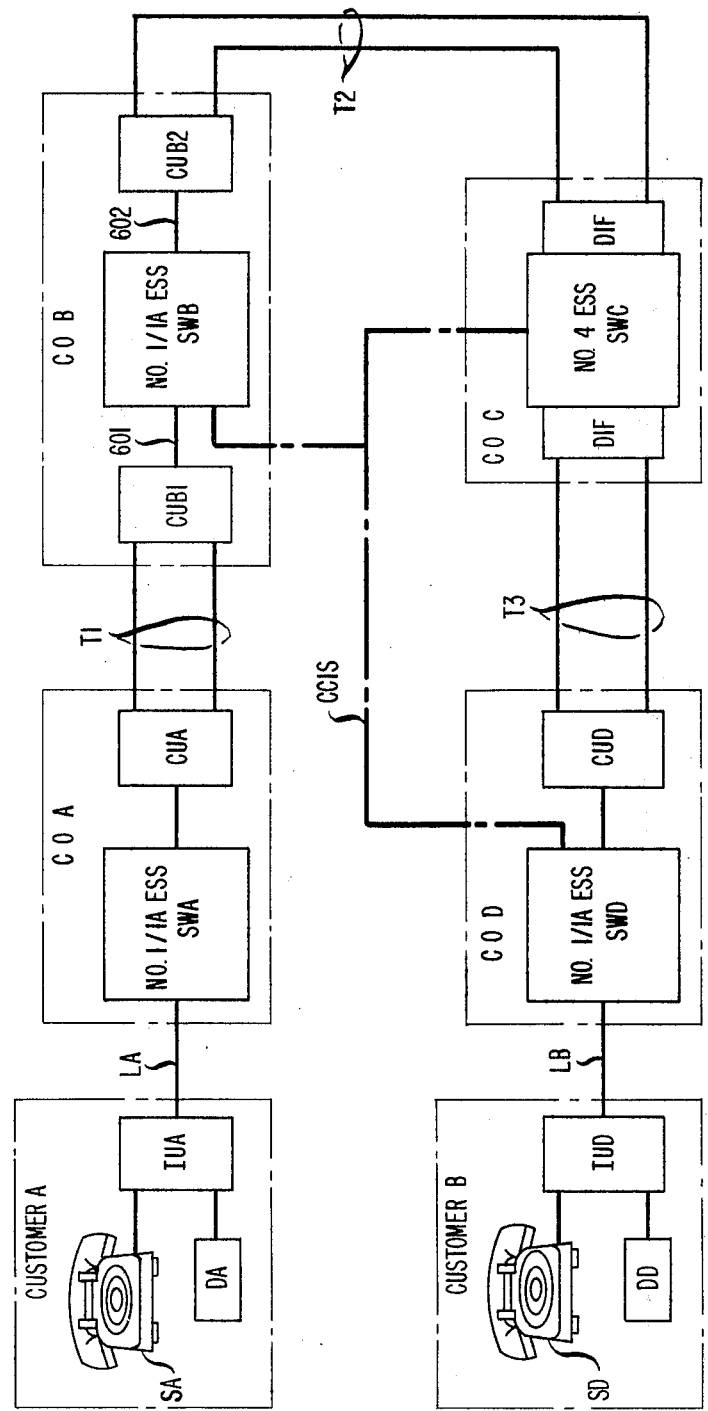
FIG. 6 shows a typical tandem call connection path between customers.

FIG. 6 illustrates a connection between a customer A at central office COA and a customer D at central office COD, involving two tandem switching offices COB and COC. For illustrative purposes, it is assumed that COB is a No. 1A ESS and that COC is a No. 4 ESS. The end offices COA and COB are again assumed to be No. 1A ESS switches.

Customer A is connected to office COA via interface unit IUA and customer D is connected to office COD via interface unit IUD. As described before, channel units CUA and CUD are in a "local" state since they are connected directly to the customer's two-wire facilities (loops LA and LB). However, in the tandem switch of COB, channel units CUB 1 and CUB 2 are in a "tandem" state since they are connected by the switching network SWB.

With reference to FIG. 2, assume that CUA is connected in a tandem state. Common control CCA provides this "tandem" indication to CUA. For illustrative purposes, FIG. 2 shows this indication as the presence of a voltage on lead TAN, which operates relay R5. This causes CUA to be in a tandem state. In this state, circuit 206 no longer controls whether hybrid DH or hybrid VH is connected to the two-wire port. This mode control is now achieved by circuit 208 (via relay contacts R5-3) which receives the analog/digital mode indication on RB8 from the T1 line, and operates or releases relay R2. In other words, when a channel unit is in a "tandem" state, it connects hybrid DH or hybrid VH and the associated DC polarities on the T and R leads of the two-wire port, as dictated by the mode indication on the incoming T1 bit stream.

In addition, when in a tandem state, the channel unit uses relay R1 as a conflict indicator. When two connected CU's are in the same mode, they present the same hybrids and the same polarities on the T and R leads. Consequently, no current flows in relay R1 of either channel unit. When two connected channel units are in opposite modes, they present different hybrids, hence opposite polarities on the T and R leads. This causes relay R1 in both units to operate. Hence, when in a tandem state, the operated state of R1 indicates a mode conflict, while the released state of R1 indicates a mode agreement with the connected channel unit.

When in a tandem state, a channel unit has to indicate the state of the connected channel unit to its outgoing T1 line, by presenting the proper voice/digital indication on lead V-D of FIG. 2. Remember that R5 is operated. When R1 is released, the outputs of trunk control circuit 208 are connectes straight through to the inputs of circuit 207, via the break contacts R1-2. As a result, when, for example, circuit 208 detects a digital mode indication on the incoming T1 line and CUA is therefore in the digital mode, the output of circuit 207 also indicates the digital mode, indicating that, because no conflict is detected, the connected channel unit is also in the digital mode. However, if R1 is operated, the outputs of circuit 208 are cross-connected to the inputs of circuit 207 via the make contacts R1-2. In this condition, a "digital" indication received on 208 results in a "voice" indication at output V-D of circuit 207. In this manner, the channel unit in a tandem connection pass the mode indication of the connected channel unit to the outgoing T1 bit stream.

Finally, note that, when in the tandem state, R5 is operated and its contacts R5-4 and R5-5 prevent operation of both relays R3 and R4. No FED tone or FEV data pattern is even transmitted by a channel unit when in the tandem state. These indications are provided, when necessary, by channel units CUA and CUD of FIG. 6, that are directly connected to the subscribers, and are therefore in a local state.

With reference to FIG. 6, the establishing of a call between customer A of central office COA and customer D of central office COD proceeds in the following manner. As previously described a call is initiated when customer A goes off-hook at station SA. Central office COA detects the tip to ring loop current (since all voice/digital calls are established in a voice mode) as previously described. A digit receiver is connected to and supplies dial tone to customer A over loop LA. Customer A dials the voice/digital data operating mode access code and the telephone number of customer D. Note this dialing can obviously be manually via a keypad or automatically if interface unit IUA is so equipped. Central office COA collects the digits in the normal manner, determines that a voice/digital data call (V/D) is being made, and selects an outgoing voice/digital data (V/D) trunk on carrier facility T1. As noted previously, central office COA only selects V/D trunks to the other central offices once a V/D call is requested. Hence, the other central offices know a V/D call is being received since a V/D trunk is being utilized.

With reference to FIG. 6, the selected facility involves channel unit CUA in office COA and channel unit CUB 1 in office COB. Since both COA and COB are assumed to be No. 1A ESS offices, the inter-office signaling can be implemented either on a per-trunk basis (using MF or any other signaling method), or by common channel inter-office signaling CCIS. Office COA signals the called number to office COB. When sufficient information on the called party has been received by COB, a VID facility to office COC is seized and office COB signals the called number to office COC. Since office COC is assumed to be a No. 4 ESS, common channel inter-office signaling (CCIS) is used between COB and COC. After receipt of the called number, COC seizes a VID facility to office COD and sends the called number to COD using CCIS signaling. The call arrives at COD on a facility that includes channel unit CUD. Office COD establishes a connection between CUD and an audible tone circuit, and between called customer B a ringing circuit. Customer B's telephone rings and customer A hears the audible ringing tone. After customer B answers, COD connects IUD of the called customer to channel unit CUD. At this point in the call, CUA is in a local state and in the voice mode, since customer A is in the voice mode. Channel unit CUD is likewise in a local state and in the voice mode because customer B is in the voice mode. At office COB channel units CUB 1 and CUB 2 are in a tandem state. CUB 1 is in the voice mode because it receives the voice mode indication from CUA. Likewise CUB 2 is in the voice mode because it receives the voice mode indication from CUD via office COC.

Let us now examine the mode indications as they traverse the No. 4 ESS (office COC). On the channel of facility T2 that is used for the connection, office COB sends the voice off-hook condition (A=1, B=0). Remember that the A and B bits are the least-significant channel bits occurring in transmission frames 6 and 12 respectively. Since the incoming frame on facility T2 and the outgoing frame on facility T3 are not necessarily equal, the A and B bits received on T2 are not necessarily A and B bits (i.e. bits occurring in frames 6 and 12) on facility T3.

Referring to FIG. 2, assume that CUA represents CUD of FIG. 6. Trunk control circuit 208 has to determine the mode from bits 8 (on lead RB8) of the communication channel, but does not know which of these bits are really A and B bits. The algorithm for detecting the mode by examining bits 8 is simple. Remember that digital mode indications have all bits 8 either consistently "1" or constantly "0", while in voice on and off hook modes, bits A and B are opposed (0,1 or 1,0), while the other ten occurances of bit 8 during a super frame represent the least significant bit of the pcm encoded voice sample. This means that in the voice mode, any consecutive group of at least 12 bits 8 must contain at least one "1" and at least one "0" since it must contain an A and a B bit. However, in the data mode, such a group can consist of all "1"s or all "0"s. Those skilled in the art may utilize various embodiments of this basic algorithm to implement the function of circuit 208.

For reasons explained above circuit 210 of channel unit CUA in FIG. 2 when this CU is associated with a facility that terminates on a No. 4 ESS cannot function. Its output ST, which in channel units that are connected to facilities terminating on a No. 1A ESS indicates the on-off hook condition at the distant end, is ignored by common control CCA of office COD. Instead, common channel interoffice signaling is used between offices COD and COC (and similarly, between offices COC and COB) to convey such conditions as answer (off-hook) and disconnect (on-hook).

The V/D call has now been completed in the voice mode between customer A and customer D. In this condition, interface unit IUA and channel unit CUA permit current flow from the tip lead T to the ring lead R. Channel unit CUB 1 and channel unit CUB 2 both have the tip lead T at a ground potential at the ring lead R at −48 V. Hence, no current flows between channel unit CUB 2 and channel unit CUB 1 (i.e., no conflict). Channel unit CUD and interface unit IUD permit current flow from the tip lead T to the ring lead R.

At this time, normal voice conversation takes place between customer A and customer D. As noted previously, the voice signal is transmitted in PCM format on the T-carrier facilities and through the No. 4 ESS located at central office COC. The PCM signal is converted to an analog form for transmission through the No. 1/1A ESS networks and loops associated with central offices COA, COB and COD. At the outgoing 4-wire side of channel units CUA, CUB 1, CUB 2 and CUD the A and B bits have the values 1 and 0, respectively, indicating voice off-hook mode.

Assuming that customer A wishes to initiate a switch to the digital mode, the current on loop LA is interrupted to interface unit IUA. Channel unit CUA detects the loss of loop current on loop LA and reverses the battery and ground connects to loop LA, reestablishing current flow to interface unit IUA. As previously described, no reappearance of current on loop LA indicates that customer A has gone on-hook. Assuming current on loop LA resumes, channel unit CUA is placed in the digital mode. At this time channel unit CUA and interface unit IUA immediately begin balancing their hybrids as previously described. During the balancing process, channel unit CUA continuously transmits via lead T8B a "transition in progress" (TIP) control mode characters (in which bit 8=0) on the outgoing T-carrier line T1 and monitors only bit 8 via lead RB8 on the incoming T-carrier line T1. At the end of the balancing process, channel unit CUA detects a mode conflict since it is in the digital mode and the incoming T-carrier signal on carrier facility T1 indicates (via A/B bits which are 1/0) that interface unit IUD is in the voice mode. Accordingly, channel unit CUA continuously generates and transmits "far end voice" (FEV) control mode characters to interface unit IUA. In the reverse direction, channel unit CUA simply repeats the signal received from interface unit IUA on to the outgoing carrier facility T1. Interface unit IUA transmits "control mode idle" (CMI) characters at this time to channel unit CUA.

At the initiating of the balancing process, the bit 8 pattern on carrier facility T1 directed to central office B has changed. The previous bit 8 pattern A/B=1/0 (off-hook voice) pattern changed to a constant 0 in bit 8 since the TIP and CMI characters, being control mode, have bit 8 set to 0. Since channel unit CUB 1 is in off-hook state, it is able to pass this mode change information to channel unit CUB 2. This is done by reversing the battery and ground connections to the T and R leads 601, causing loop current to flow through the No. 1/1A ESS networks at COB to channel unit CUB 2. Channel unit CUB 2 detects the current flow on the T and R leads (2-wire side) and thus detects that interface unit IUA is in the digital mode. Channel unit CUB 2 forwards this information to interface unit IUD by generating the transmitting TIP characters on trunk T2.

At this time, channel unit CUB 1 is receiving bit 8=0 (digital data mode) over trunk T1 and is transmitting bits A/B=1/0 (voice mode) over trunk T1. Channel unit CUB 1 has lead T=−48 V and lead R at ground. Channel unit CUB 2 has lead T at ground and lead R=−48 V. Channel unit CUB 2 is receiving bits A/B=1/0 and is outputting bit 8=0. The T-carrier bit stream on carrier facility T2 passes through the No. 4 ESS at central office COC unchanged. However, since No. 4 ESS is a time division multiplexing machine, the bytes or words may not be in the same position in the superframe. Thus, the concept of A and B bits is meaningless when applied to the bit stream leaving a No. 4 ESS. However, techniques are known to recover the necessary information from bit 8 alone without knowing the specific identify of A and B bits.

When channel unit COD detects that bit 8 is constantly 0 it signals interface unit IUD that interface unit IUA is in the digital mode. This is done by generating "far end digital" tone (FED) and sending it to interface unit IUD over loop LD. Interface unit IUD detects this tone and notifies customer D via a lamp (109 of FIG. 1) or tone signal (not shown). At this time, the two interface units are in conflicting modes, and each customer A and D is aware of the other's mode. The two interface units IUA and IUD remain in this configuration as long as customer A and D are ordering them to be in opposite modes.

To complete the switch to the digital mode, customer D commands or switches interface unit IUD to the digital mode. Interface unit IUD reverses the permitted direction of loop current flow on loop LD. Channel unit CUD detects the loss of loop current, reverses battery feed, and detects the reestablishment of current on loop LD. Interface unit IUD and channel unit CUD are now in the digital mode and initiate the balancing and the respective data hybrids.

Channel unit CUD simultaneously transmits TIP characters (bit 8=constantly 0) on facility T3. These characters are passed through central office COC to facility T2 and detected by channel unit CUB 2 in office COB. Since this channel unit is in a sender state, it obeys the digital mode indication received on T2. Since CUB 1 is already in the digital mode, the transition of CUB 2 to the digital mode causes the disappearance of conflict indicators in both CUB 1 and CUB 2. Therefore CUB 1 transmits a digital mode indication to CUA of central office COA. This channel unit, which is in a local state and is therefore in a digital mode, following the command from cutomer A, had been sending far-end voice (FEV) characters to customer A because it was recognizing a conflict between the digital mode of customer A and the voice mode indication arriving on facility T1. Since CUB 1 now starts sending a digital mode indication to CUA, this channel unit stops sending FEV characters to customer A and repeats the digital patterns received on T1 to the customer. At this point, exchange of 56 kb/s data between customers A and B can begin.

When a customer wishes to return to the voice mode an appropriate action is taken at the interface unit. Assume in this case that customer D makes the decision to switch to the voice mode. Interface unit IUD stops sending data, and reverses the permitted direction of current flow on loop LD, and switches the station set SD on to loop LD. Channel unit CUD detects the loss of loop current, reverses its battery feed to loop LD, thus reestablishing loop current. Channel unit CUD switches to the voice mode by switching its voice hybrids onto loop LD and causing the transmission of PCM encoded voice over carrier facility T3 with A/B bits encoded as 1/0. Since the incoming T-carrier bit stream on carrier facility T3 indicates that interface unit IUA is in the digital mode channel unit CUD detects the incompatibility of the modes between interface unit IUA and interface unit IUD. Being in the voice mode itself, channel unit CUD therefore generates the "far end digital" tone (FED) and sends it to interface unit IUD, causing interface unit IUD to indicate to its customer that the far end is in the digital mode.

The PCM encoded voice signal from channel unit CUD propagates through central office COC to channel unit CUB 2. Once channel unit CUB 2 has detected the change of the incoming bit 8 pattern, it switches into the voice mode. This switch involves connecting the voice hybrid on the 2-wire side of the channel unit, reversing the battery connection and interpreting the incoming signal from T-carrier facility T2 as PCM encoded voice. The battery reversal at channel unit CUB 2 causes a loop current to flow through the No. 1/1A ESS network at COB to channel unit CUB 1.

This current indicates to channel unit CUB 2 that interface unit IUA is in the opposite mode to interface unit IUD. Since channel unit CUB 2 knows that interface unit IUD is in the voice mode, due to the bit 8 pattern incoming on carrier facility T2, it determines that interface unit IUA remains in the digital mode. Thus, channel unit CUB 2 causes transmission of a PCM voice silent code on carrier facility T2.

Meanwhile, channel unit CUB 1 also detects the flow of loop current. Channel unit CUB 1 switches to the voice mode and causes the encoding of the incoming voice signal on its 2-wire side as PCM with A/B bits added. This PCM signal is sent out on carrier facility T1. Since the signal incoming to channel unit CUB 1 on carrier facility T1 continues to indicate that interface unit IUA is in the digital mode, the incoming digital signal from carrier facility T1 is discarded after checking its bit 8 pattern. Channel unit CUB 1 transmits a voice silent signal on the 2-wire facility to channel unit CUB 2.

Channel unit CUA detects the changed bit 8 pattern received on carrier facility T1. Since channel unit CUA is in the digital mode, it generates a digital character (FEV) to inform interface unit IUA that interface unit IUD is in the voice mode. Channel unit CUA generates this signal and sends it on loop LA to interface unit IUA while continuing to pass data received from interface unit IUA to trunk T1. Interface unit IUA detects the incoming FEV characters and signals its customer that the distant interface unit is in the voice mode.

At this time the two interface units are in opposite modes but both are aware of that fact. To complete the switch to the voice mode, customer A switches interface unit IUA to the voice mode. When this is completed, current is interrupted on loop LA. Channel unit CUA detects the loss of loop current, reverses loop battery feed and switches to the voice mode. Once in the voice mode, channel unit A begins encoding the incoming voice from loop LA (with A/B bits added) and decoding the incoming T-carrier signal from trunk T1 into voice signals which are sent out on loop LA.

Channel unit CUA transmits the encoded voice over trunk T1 towards channel unit CUB 1. When channel unit CUB 1 detects the changed bit 8 pattern, it reverses its battery feed to its 2-wire port. This causes loop current to disappear, indicating that mode compatibility has been achieved. Channel unit CUB 1 now becomes transparent to voice signals in both directions, doing the normal PAM encoding/decoding function. The loss of loop current flow has the same effect on channel unit CUB 2 causing it to become transparent to voice signals.

Channel unit CUD also detects the return of the bit 8 pattern to that associated with A/B bit signaling. Since it is already in the voice mode, compatibility has been achieved. Therefore, channel unit CUD stops sending a FED tone and allows voice transmission in both directions. Normal voice transmission may now take place between customer A and customer D.

What has been described is merely illustrative of my invention. While the description was directed to a voice/data communication system the invention can be arranged to signal any two operating modes of a digital or analog communication system. Those skilled in the art may advantageously utilize the concepts taught herein to implement other embodiments providing similar functions without deviating from the scope or spirit of the disclosed invention.

What is claimed is:

1. In a communication system including a subscriber unit adapted for connection over a transmission facility to a central unit, said system operating in either an analog or a digital communication mode, apparatus for signaling the communication mode between said subscriber unit and said central unit characterized in that
said apparatus includes
first means for providing at said central unit a first polarity dc signal over said facility representing a first operating mode,
means for changing at said subscriber unit said first polarity dc signal received over said facility to signal the central unit of a change in the communication mode at said subscriber unit, and
second means for providing at said central unit in response to an interruption of said first polarity dc signal a second polarity dc signal over said facility representing a second operating mode.

2. An arrangement for signaling the operating modes of a communication system, said arrangement including a subscriber unit adapted for connection over a transmission facility to a central unit characterized in that
said subscriber unit includes
first means for signaling a first operating mode to said central unit by allowing the reception of a first polarity dc signal over said facility,
second means for signaling a second operating mode to said central unit by allowing the reception of a second polarity dc signal over said facility,
means for coupling either said first signaling means or said second signaling means to said facility, and
said central unit includes
first means for providing a first polarity dc signal over said facility,
second means for providing a second polarity dc signal over said facility, and
switching means for alternating the connection of said first providing means and said second providing means to said facility in response to a dc signal interruption on said facility resulting from an operation of said coupling means.

3. The invention of claim 1 or claim 2 wherein said central unit includes means responsive to a first control signal for connecting either said first providing means or said second providing means to said facility,
means for detecting an interruption of a dc signal on said facility, and
means responsive to said detecting means for producing said first control signal to said connecting means to interchange the providing means connected to said facility.

4. The invention of claim 3 wherein said central unit further includes means responsive to a signal received over a second facility from a remote unit for establishing a second control signal to connect either said first providing means or said second providing means to said facility, and means for transferring control of said connecting means from said first control signal of said producing means to said second control signal of said establishing means.

5. The invention of claim 1 or claim 2 wherein said central unit further includes means for comparing the operating mode of said subscriber unit with the operating mode of a remote unit connected to said central unit over a second facility and means for sending a conflict signal over said facility to said subscriber unit in response to an output from said comparing means indicating a difference in operating modes between said subscriber unit and said remote unit.

6. The invention of claim 1 or claim 2 wherein said central unit further includes means responsive to a continued interruption in the dc signal on said facility for terminating the connection between said subscriber unit and said central unit.

7. The invention of claim 1 or claim 2 wherein said central unit further includes means responsive to a dc signal interruption for transmitting a signal representing the operating mode of said subscriber unit over a second facility to a remote unit.

8. Apparatus for controlling the analog or digital communication mode of a transmission facility characterized in that said apparatus includes means responsive to a control signal for providing either a first polarity dc signal over said facility to represent a first communication mode or a second polarity dc signal over said facility to represent a second communication mode and control means for generating said control signal to interchange the existing coupling of said providing means in response to a predetermined interruption in the dc signal on said facility.

9. The invention of claim 8 wherein said apparatus further includes means responsive to a signal received over a second facility from a remote unit for establishing a second control signal to said providing means and means for transferring control of said providing means from said control signal of said control means to said second control signal of said establishing means.

10. The invention of claim 8 wherein said apparatus further includes means for comparing the communication mode of said subscriber unit with the communication mode of a remote unit connected to said apparatus over a second facility and means for sending a conflict signal over said facility to said subscriber in response to an output from said comparing means indicating a difference in communication modes between said subscriber unit and said remote unit.

11. The invention of claim 9 wherein said conflict signal from said sending means is a signal indicating the operating mode of said remote unit.

12. The invention of claim 8 wherein said apparatus further includes means responsive to a continued interruption in the dc signal on said facility for terminating a communication connection between said subscriber unit and said apparatus.

13. The invention of claim 8 wherein said apparatus further includes means responsive to said control means for transmitting a signal representing the communicating mode of said subscriber unit over said second facility to said remote unit.

14. The invention of claim 8 wherein said providing means includes a voice hybrid and a digital data hybrid.

15. A subscriber unit adapted to communicate in a first or a second operating mode over a transmission facility characterized in that said subscriber unit includes first means for signaling a first operating mode by allowing the reception of a first polarity dc signal over said facility, second means for signaling a second operating mode by allowing the reception of a second polarity dc signal over said facility, and means responsive to a subscriber input for switching either said first or second means to said facility.

16. The invention of claim 15 wherein said switching means concurrently switches communication signals to said facility from either a first operating mode means or a second operating mode means.

17. The invention of claim 15 wherein said subscriber unit further includes means for preventing the reception of said first and second polarity dc signal from said facility.

18. The invention of claim 15 wherein said subscriber unit further includes means for outputting a humanly recognizable signal from a conflict signal received over said facility to indicate a conflict in operating modes between said subscriber unit and a remote unit connected over said facility to said subscriber unit.

19. In a communication system including a subscriber unit adapted for connection over a transmission facility to a central unit, said system operating in either an analog or digital communication mode, a method of signaling the communication mode between said subscriber unit and said central unit characterized by the steps of (a) providing at said central unit a first polarity dc signal over said facility representing a first operating mode, (b) interrupting at said subscriber unit said first polarity dc signal over said facility to represent a change in the communication mode at said subscriber unit, and (c) providing at said central unit in response to said interrupting step a second plarity dc signal over said facility representing a second communication mode.

20. In a communication system including a subscriber unit connected over a transmission facility to a central unit, said system operating in either an analog or a digital communication mode, a method of signaling the communication mode between said subscriber unit and said central unit characterized by the steps of (a) providing at said central unit a first polarity dc signal over said facility representing the establishment of a first communication mode, (b) providing at said central unit a second polarity dc signal over said facility representing the establishment of a second communication mode, and (c) alternating between steps (a) and (b) in response to a predetermined interruption of the dc signal on said facility representing a change in the communication mode at said subscriber unit.

21. The method of claim 20 further including the steps of establishing the connection of either said first polarity dc signal or said second polarity dc signal to said facility in response to a signal received over a second facility from a remote unit and transferring control of said providing steps (a) and (b) from said alternating step (c) to said establishing step.

22. The method of claim 20 further including the steps of comparing the communicating mode of said facility with a communicating mode of a second facility connected to said central unit and sending a conflict signal over said facility to said subscriber unit in response to a difference in communicating modes between said facility and said second facility as determined by said comparing step.

23. A method for controlling the analog or digital communication mode of a transmission facility characterized by the steps of providing either a first polarity dc signal over said facility to represent a first communication mode or a second polarity dc signal over said facility to represent a second communication mode and interchanging the dc signal coupled to said facility during the providing step in response to a predetermined interruption in the dc signal on said facility.

24. A method of signaling a change in the analog or digital communication mode of a transmission facility characterized by the steps of (a) signaling a first communicating mode by receiving a first polarity dc signal over said facility, (b) signaling a second communicating mode by receiving a second polarity dc signal over said facility, and (c) switching between steps (a) and (b) in response to a subscriber input.

* * * * *

UNITED STATES PATENT AND TRADEMARK OFFICE
CERTIFICATE OF CORRECTION

PATENT NO. : 4,421,951

DATED : December 20, 1983

INVENTOR(S) : John G. Van Bosse

It is certified that error appears in the above-identified patent and that said Letters Patent is hereby corrected as shown below:

Column 11, line 60, "CUB of" should read --CUB of customer B.--.

Signed and Sealed this

Twenty-seventh Day of November 1984

[SEAL]

Attest:

GERALD J. MOSSINGHOFF

Attesting Officer

Commissioner of Patents and Trademarks